US008200710B2

(12) United States Patent
Sagi et al.

(10) Patent No.: US 8,200,710 B2
(45) Date of Patent: Jun. 12, 2012

(54) SYSTEM AND METHOD FOR RUNTIME RENDERING OF WEB-BASED USER INTERFACES FOR MASTER DATA MANAGEMENT

(75) Inventors: Shachar Sagi, Amirim (IL); Walter L. Kahn, Karmiel (IL); Isam Awad, Ililin Village (IL)

(73) Assignee: SAP AG, Walldorf (DE)

( * ) Notice: Subject to any disclaimer, the term of this patent is extended or adjusted under 35 U.S.C. 154(b) by 328 days.

(21) Appl. No.: 12/510,931

(22) Filed: Jul. 28, 2009

(65) Prior Publication Data

US 2011/0029575 A1 Feb. 3, 2011

(51) Int. Cl.
G06F 7/00 (2006.01)
G06F 17/30 (2006.01)
(52) U.S. Cl. .......................... 707/802; 707/803; 707/805
(58) Field of Classification Search .................. 707/790, 707/791, 792, 793, 796, 802, 903, 804, 805, 707/807, 808, 809
See application file for complete search history.

(56) References Cited

U.S. PATENT DOCUMENTS

| 7,599,947 | B1 * | 10/2009 | Tolbert et al. ........................ 1/1 |
| 7,657,868 | B2 * | 2/2010 | Shenfield et al. ............. 717/107 |
| 7,689,923 | B2 * | 3/2010 | Massasso et al. ............. 715/762 |
| 7,814,404 | B2 * | 10/2010 | Shenfield ...................... 715/200 |
| 7,836,392 | B2 * | 11/2010 | Stuhec et al. .................. 715/234 |
| 7,890,478 | B2 * | 2/2011 | Fiedler ........................... 707/694 |
| 7,895,566 | B2 * | 2/2011 | Shenfield et al. ............. 717/107 |
| 7,908,598 | B2 * | 3/2011 | Betts et al. .................... 717/165 |
| 8,099,671 | B2 * | 1/2012 | Arthursson et al. ........... 715/760 |
| 8,117,553 | B2 * | 2/2012 | Danninger et al. ........... 715/764 |
| 2004/0046789 | A1 * | 3/2004 | Inanoria ........................ 345/748 |
| 2005/0057560 | A1 * | 3/2005 | Bibr et al. ..................... 345/418 |
| 2005/0278622 | A1 * | 12/2005 | Betts et al. .................... 715/515 |
| 2006/0004768 | A1 * | 1/2006 | Betts et al. ...................... 707/10 |
| 2006/0206890 | A1 * | 9/2006 | Shenfield et al. ............. 717/174 |
| 2006/0236254 | A1 * | 10/2006 | Mateescu et al. ............. 715/762 |
| 2007/0038983 | A1 | 2/2007 | Stienhans |
| 2007/0255718 | A1 | 11/2007 | Baikov |
| 2009/0049539 | A1 | 2/2009 | Halbedel |
| 2009/0144606 | A1 | 6/2009 | Vignet |
| 2010/0185701 | A1 * | 7/2010 | Ramamurthi et al. ........ 707/803 |
| 2010/0235725 | A1 * | 9/2010 | Drayton et al. ................ 715/234 |
| 2010/0241978 | A1 * | 9/2010 | Genovese et al. ............. 715/765 |
| 2010/0325606 | A1 * | 12/2010 | Sundararajan et al. ....... 717/105 |

* cited by examiner

Primary Examiner — Don Wong
Assistant Examiner — Merilyn Nguyen
(74) Attorney, Agent, or Firm — Buckley, Maschoff & Talwalkar LLC (57) ABSTRACT

One or more embodiments enable a system and method for creation and runtime rendering of web-based user interface applications for a master data management applications. The system and method comprise acquiring metadata of a schema of a master data management database at initialization, the metadata identifying a plurality of schema elements; selecting a schema element of the plurality of schema elements in the schema metadata; identifying a set of all appropriate Web UI element options for the schema element; presenting to a UI designer a graphic user interface populated with the schema element and the set of all appropriate Web UI element options for the schema element; accepting from the UI designer a selected Web UI element from the set of all appropriate Web UI element options; generating a Web UI component definition comprising a link between the schema element and the selected Web UI element; storing the Web UI component definition related to the link in the master data management database.

9 Claims, 9 Drawing Sheets

SYSTEM AND METHOD FOR RUNTIME RENDERING OF WEB-BASED USER INTERFACES FOR MASTER DATA MANAGEMENT

BACKGROUND OF THE INVENTION

1. Field of the Invention

Embodiments of the disclosure provided herein pertain to the field of computer systems. More particularly, but not by way of limitation, one or more embodiments enable a system and method for creation and runtime rendering of web-based user interface applications for a master data management application.

2. Related Art

Enterprise systems and others using a master data management (MDM)-type databases are customized by the system owner at installation, and thus vendor pre-creation of a customized user interface for a user's particular MDM schema is not possible. As used herein, the term master data management (MDM) means a program that supports unified data storage across company branches in a heterogeneous information technology landscape. Thus, MDM systems ensure that the data is consistent across system boundaries, irrespective of the system location or vendor. SAP, IBM, Oracle, Sybase and other manufacturers all produce MDM systems.

Various tools and frameworks have been created to aid users in self-development of custom user interfaces for MDM-type systems. Web Dynpro ("WD") development environment, from SAP, is a model-view-controller ("MVC")-type program and framework for the SAP's application servers, and is an example of an application designed to support the development of customized user interfaces for MDM systems.

In the past, to create a user interface ("UI") for display in a web browser (a "web UI") customized to a particular MDM schema required a user interface designer or programmer with software development skills, knowledge of customer specific database schema and knowledge of the MDM's Application Program Interface ("API"), as well as knowledge of development tools such as WD.

Therefore, it would be an advancement to have a method and system to create a web UI interface for an MDM-type database system without the presently required special knowledge and programming skills referred to above.

For at least the limitations described above there is a need for system and method for creation and runtime rendering of web-based user interface applications for a master data management applications. Both the foregoing and the following detailed description are exemplary and explanatory only, and should not be considered restrictive of the scope of the embodiments, as described and claimed herein. Features and/or variations may be within the scope and intent of the disclosure provided here other than those provided and set forth herein.

BRIEF SUMMARY OF THE INVENTION

One or more embodiments of the disclosure provided enable a system and method for creation and runtime rendering of web-based user interface applications for a master data management applications.

The system and method described herein comprise acquiring metadata of a schema of a master data management database at initialization, the metadata identifying a plurality of schema elements; selecting a schema element of the plurality of schema elements in the schema metadata; identifying a set of all appropriate Web UI element options for the schema element; presenting to a UI designer a graphic user interface populated with the schema element and the set of all appropriate Web UI element options for the schema element; accepting from the UI designer a selected Web UI element from the set of all appropriate Web UI element options; generating a Web UI component definition comprising a link between the schema element and the selected Web UI element; storing the Web UI component definition related to the link in the master data management database.

BRIEF DESCRIPTION OF THE DRAWINGS

The above and other aspects, features and advantages of the solution described herein will be more apparent from the following more particular description thereof, presented in conjunction with the following drawings wherein.

DETAILED DESCRIPTION

A system and method for creation and runtime rendering of web-based user interface applications for a master data management applications will now be described. In the following exemplary description numerous specific details are set forth in order to provide a more thorough understanding of embodiments of the solution. It will be apparent, however, to an artisan of ordinary skill that the solution described herein may be practiced without incorporating all aspects of the specific details described herein. In other instances, specific features, quantities, or measurements well known to those of ordinary skill in the art have not been described in detail so as not to obscure the solution explained herein. Readers should note that although numerous examples and variations of the solution are set forth herein, the claims, and the full scope of any equivalents, are what define the invention.

MDM User Interface Development

A number of tools are available to assist the user interface designer (UI Designer) in developing user interfaces for master data management (MDM)-type databases. A UI Designer, as used herein, may be an administrator or other user who has little or no knowledge about programming or framework APIs, but has some knowledge of the database schema and its schema elements. The UI Designer, as used herein, has a need to create a particular Web UI for an MDM implementation, such as for example a data input form for workers taking a telephone survey, or a form for users of the MDM system to report system failures to the Administrator. Please note that these examples are provided to illustrate the solutions explained throughout the specification, but are not intended to limit the scope of the disclosure. Therefore, the term UI Designer, as used herein, is not restricted to a person with programming skills, or those considered to be "developers," "database designers," "interface programmers" or other with knowledge of APIs, programming, database design or tools used to perform those functions, though persons of those skills may use the solutions described herein.

Web Dynpro Exemplary Development Tool for MDM System UIs

While a complete tutorial on the use of the Model View Controller (MVC) programming model, as represented by various tools for supporting web UI interface development, is beyond the scope of this application, establishing basic method and terminology is useful so as to better illustrate the advances of the embodiments described herein. In one or more embodiments, there is support for development of customer-unique web-based user interfaces and applications for an MDM system. In one exemplary embodiment, the MDM system may be a SAP Netweaver program, though the solutions are applicable against other systems and as such the disclosure is not limited to any particular implementation or vendor. Embodiments are equally applicable to all similar systems which perform substantially the same functions in substantially the same way. In Netweaver, for example, a user interface development tool, such as SAP's Web Dynpro program may be used to develop a web-based user interface for one of a plurality of client database configurations. Web Dynpro ("WD") is a client-independent programming model of the SAP NetWeaver technology platform for developing user interfaces for Web applications. The concepts of the Web Dynpro programming model are equally applicable to other similar programs and the use of this program and others like it help to ensure the following program attributes: high-performance processing of an entire Web application; clear separation of presentation and processing logic as well as data retrieval; extensive platform independence of interfaces; and high level of reusability of programs and program components.

Metamodel Concept and Declarative Programming

Web Dynpro provides support for the development of Web applications in the form of a declarative programming approach, providing software tools to describe the properties of a UI application in the form of metadata. The necessary source code is then generated automatically and executed at runtime by the Application Server. UI Events may be defined from the development environment, which provides the UI Designer with access to the program-generated source code.

In a Web Dynpro application, a user interface is made up of basic elements, called components, which are declared statically using specialized programming tools. Using these implementations, a user interface that has been created by declarative methods may be modified by generating new interface structures at runtime. Thus, declarative procedures may be combined with the implementation of source code to support the UI design.

Componentization

When a Web Dynpro application is developed, a platform-independent meta-model is created from which Java classes are generated. Since Web Dynpro features a clear separation between layout data and business data, it supports, for example, developing applications with the same programming model both for mobile devices and conventional PCs. To use the Java development infrastructure, a Web Dynpro application is divided into one or more Web Dynpro components that allow nesting large application sections and permits simpler structuring of Web applications.

Thus, the use of Web Dynpro and other similar applications for the design of MDM web UIs requires specific knowledge of MVC-type programming, Java, programming techniques to separate business and layout data, the manipulation of components and other techniques. An administrator of the system, for example, may not have the knowledge required to use Web Dynpro to generate a web UI.

Figure 1:
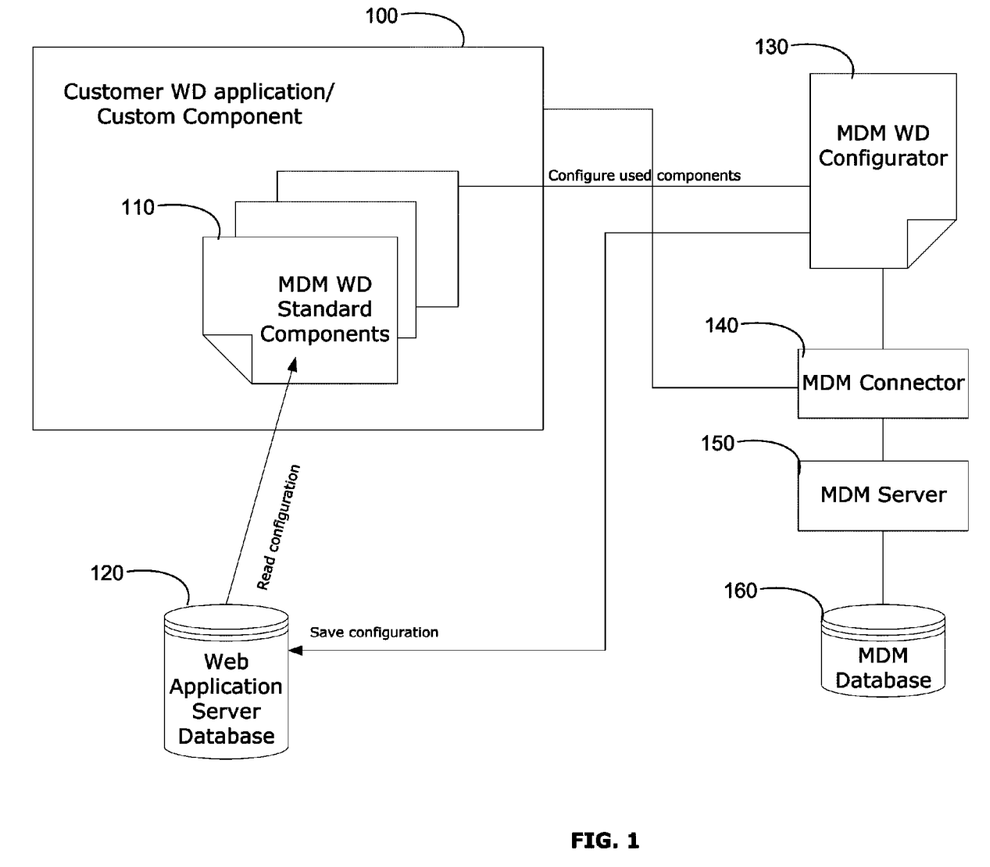
FIG. 1 illustrates an exemplary system architecture in accordance with one or more embodiments.

FIG. 1 illustrates an exemplary system architecture configured in accordance with one or more embodiments of the solution described herein. The system architecture shown in FIG. 1 shows an example embodiment using the SAP MDM and SAP Web Dynpro systems to develop custom web user interfaces for an MDM database without requiring knowledge of the MDM APIs or special programming skill Application 100 represents a customized program created to give web UI access to MDM database 160. Documents 110 represent standard MDM WD components created to implement aspects of a user interface for Application 100. MDM WD Configurator 130 may be used to create components, which are then saved back to Web Application Server Database 120. Configurator 130 may utilize specialty functions such as MDM Connector 140 or MDM server 150 to obtain data about the backend of the user interface—the MDM Database 160. MDM WD Configurator 130 may also be involved in rendering the UI at runtime to connect backend objects in MDM Database 160 with standard components 110 to display the intended information.

Figure 2:
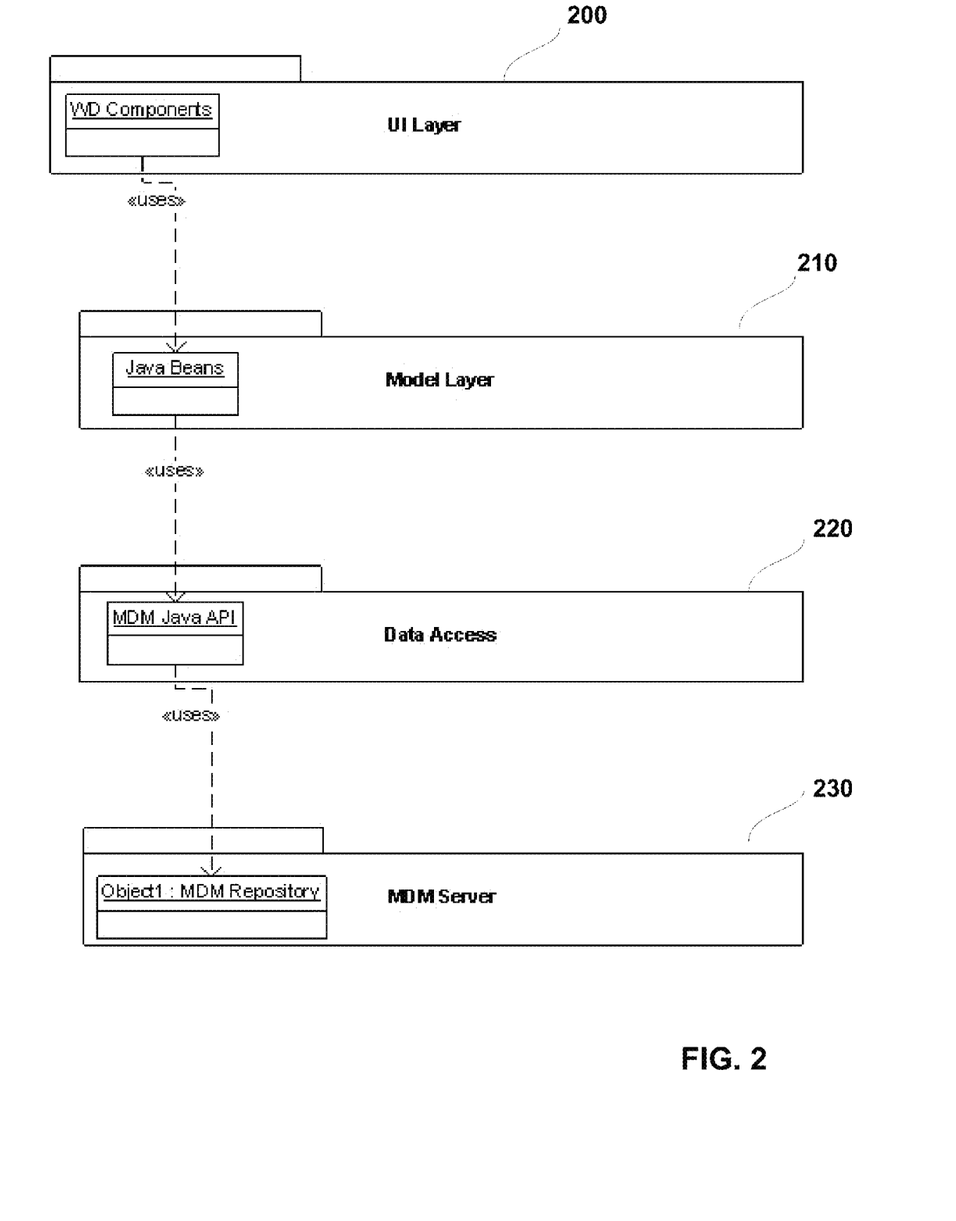
FIG. 2 illustrates an exemplarity layered model for a system in accordance with one or more embodiments.

FIG. 2 illustrates a layered interface design model for a system in accordance with one or more embodiments. Layered models are understood by those of ordinary skill in the art, and thus are not discussed in detail herein. UI Layer 200 provides WD Components that utilize, for example, Java Beans, shown in model layer 210 to render UI elements as part of the UI application. Model layer 210 isolates the UI layer from Data Access component 220, which provides access to the data objects of MDM Server 230 through the MDM Java API. As illustrated, each layer isolates the layers above and below to provide an interface between each respective layer. Further, by isolating the lower layers the approach also isolates a user from needing knowledge of the lower layers. Thus, users of the WD components of the UI later 200 do not need knowledge of the MDM Java API library in Data Access layer 220, for example.

Figure 3:
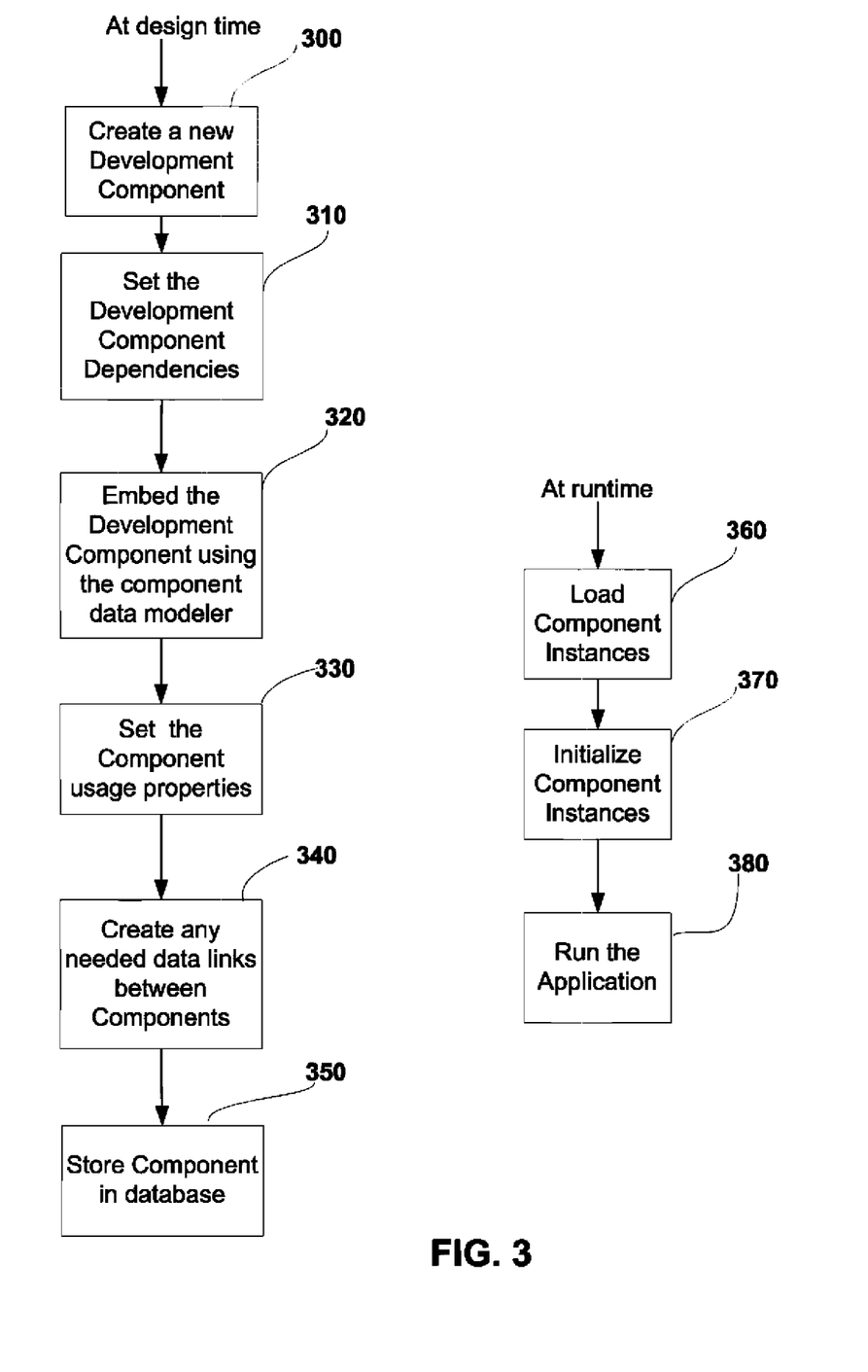
FIG. 3 illustrates a process flow for the creation and instantiation of components under process for one or more embodiments.

FIG. 3 illustrates a process flow for the creation and instantiation of WD components in one or more embodiments of the solution. At design time, starting at step 300, a tool such as WD is used to create a new development component. At step 310, the program determines the development component dependencies. At step 320 the development component may be embedded using the component data modeler. Next, at step 330, usage properties are determined and stored in the development component object. Links between the components are established at step 340. At step 350 the development component is stored in the MDM database, available to be invoked when needed. FIG. 3 also illustrates the runtime aspect of the process, where when a component instance loads, at step 360, the framework uses its own methods to initialize the component at step 370, and then run the web UI application at step 380.

Configurator 130 may comprise a generic component definition prepared and delivered with an MDM-type database, combined with an appropriate tool such as WD to allow a UI Designer to create a Web UI without programming knowledge. For example, Configurator 130 may be invoked to access a generic component definition and customize it for a particular application at a UI Designer's instruction, the instructions being provided by the UI Designer using an application such as WD. Configurator 130 may also provide the user with one or more layout options to simplify the development of a web UI.

Figure 4:
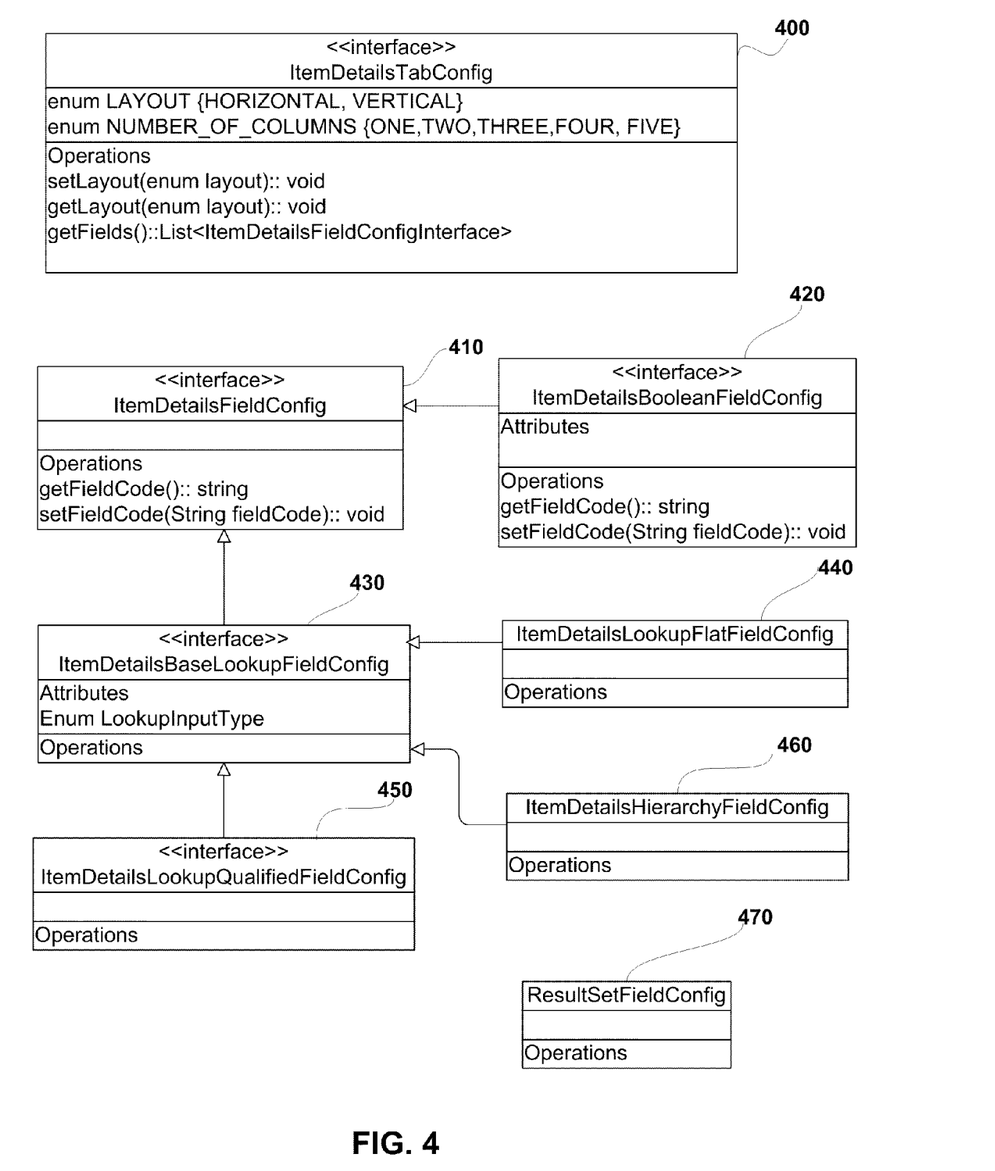
FIG. 4 illustrates a class diagram for a program enabling one or more embodiments.

FIG. 4 illustrates an exemplary class diagram for a program enabling one or more embodiments. In this example, classes for the Item Details component of the UI are illustrated. Classes 400-470 provide a class view of the breakdown of the Item Details component.

Figure 5:
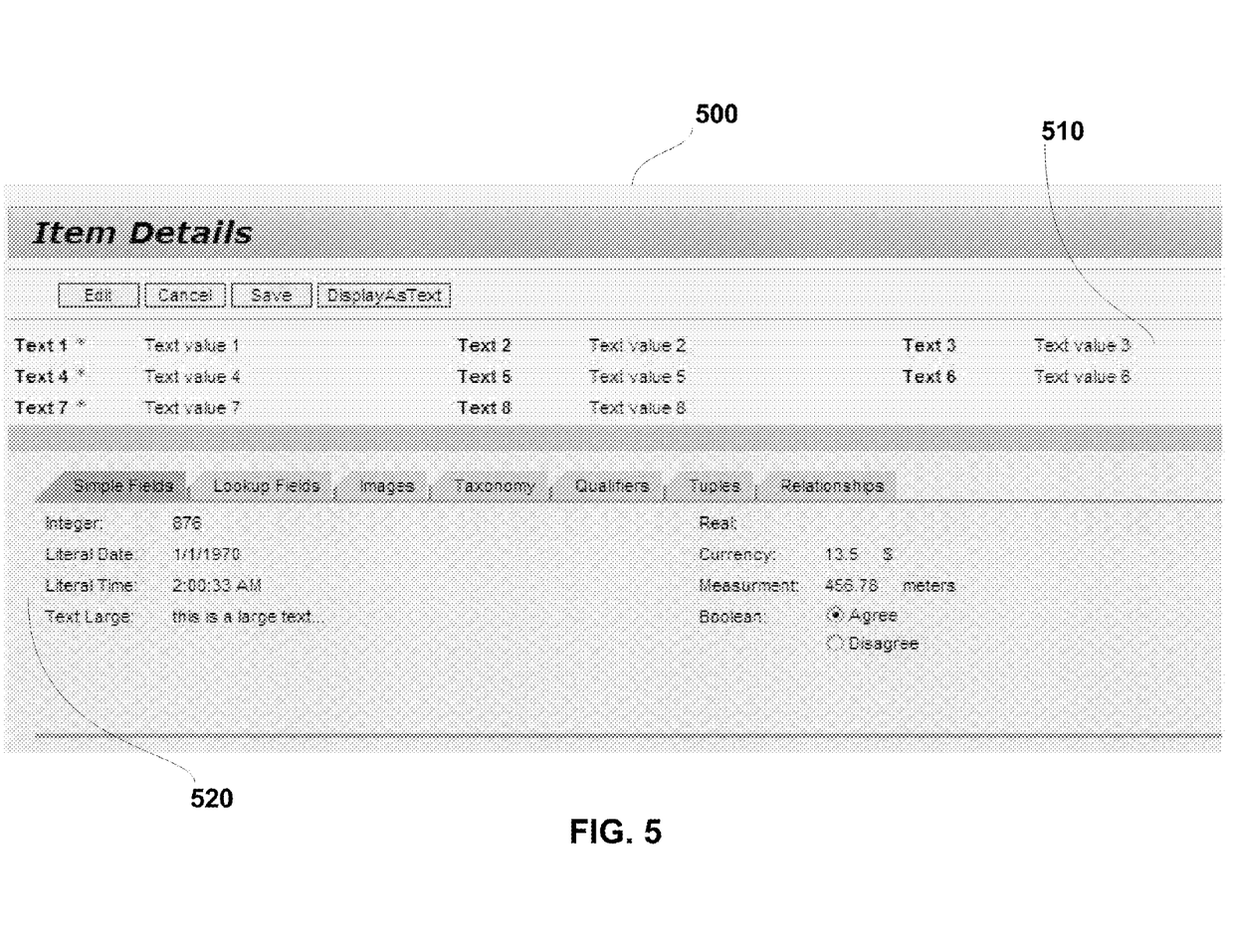
FIG. 5 illustrates an element of a user interface for creating a web browser user interface using one or more embodiments.

FIG. 5 illustrates an element of a user interface for creating a web browser user interface ("web UI") for input to a MDM system, using one or more embodiments. In this illustration, dialog box 500 shows tasks currently executing in window 510, as well as panel 520 containing tabs for each type of UI component available in WD.

The display of data records in tables and forms, and the associated editing of the tables and forms (e.g., selecting, deleting, sorting, etc) by clients are central functions in Web-based applications. Thus, various techniques are provided within web UI development frameworks for creating and working with tables in response to client requests. In particular, under a Model-View-Controller ("MVC") architecture, web-based content using tables may be created within a Web Container using "controllers" and "views" that operate in conjunction with "models" within the container. A detailed description of the MVC architecture is beyond the scope of the present disclosure but, briefly, a controller manages the underlying table structure and data (a context node.) The table structure is presented to Web clients in the form of one or more "views" that indicate, for example, how the table is presented within a Web page. Controllers may be implemented by servlets and views by Java server pages.

In an MVC architecture, a node may be filtered and/or otherwise modified in response to requests from Web clients. For example, as part of a search request a Web client may designate a filtering operation such as "only display client records in the table beginning with the letters DE" or "only display client records with a value of 1000." As a result the table node will be filtered and the results provided to the client in the form of a filtered table.

Various existing application server platforms employ MVC architecture to generate views for requesting clients. For example, Web Dynpro ("WD") is a programming paradigm developed by SAP AG (the assignee of the present disclosure) which implements Model View Controller architecture for generating and displaying views (e.g., tables) to end users. While certain embodiments of the solution described herein within the context of Web Dynpro, it should be noted that the underlying principles described in this disclosure are not limited to any particular programming paradigm.

The program provides support over and above a mode-view-controller paradigm (a Web UI Generator) tool (framework, development environment for developers to create their own UI using that tool) to allow programmatic interface access to those users unskilled in the programming arts, and to those unfamiliar with the API required to create programmatic customized user interfaces for an MDM database. For example, Web Dynpro provides such access for the Netweaver program. Web Dynpro allows users to create applications without having to create source code; however, knowledge of APIs is required. The present solution bridges this gap. It may use the Web Dynpro program to render the actual UI created by the tool, however, the tool knows how to render the resultant UI even when the type of browser or platform changes. I.e., the implementor doesn't need to know the requirements of Mozilla from IE from iPhone, for example. The configurator may handle these details for the implementor. Each layer of the architecture includes multiple containers. The Web container may itself be comprised of a servlet container for processing servlets and a Java Server Pages ("JSP") container for processing Java server pages.

At design time, WD MDM Configurator 130, at the customer's location, reads the symantics of the customer's (implementor's/administrator's) database implementation and enables the user to select whatever components, behaviors, fields, tables, or other components the implementor desires to have in the Web UI.

At runtime, Configurator 130 reads the generic configuration component of the tool and designed for the Web UI generator, and the generic configuration component may then be programmed to find the data for the particular interface to the Web UI configuration and renders the UI according to the configuration.

WD is used to create the generic component and define the default layouts. Configurator 130 reads the meta-data, shows admin the options, and stores the choices in the db. The Context is a generic component created to help find data. The result is a component for WD, where several components can be combined to create one or more web UI elements in a web UI application.

Item Details Component Controller Context

Figure 6A:
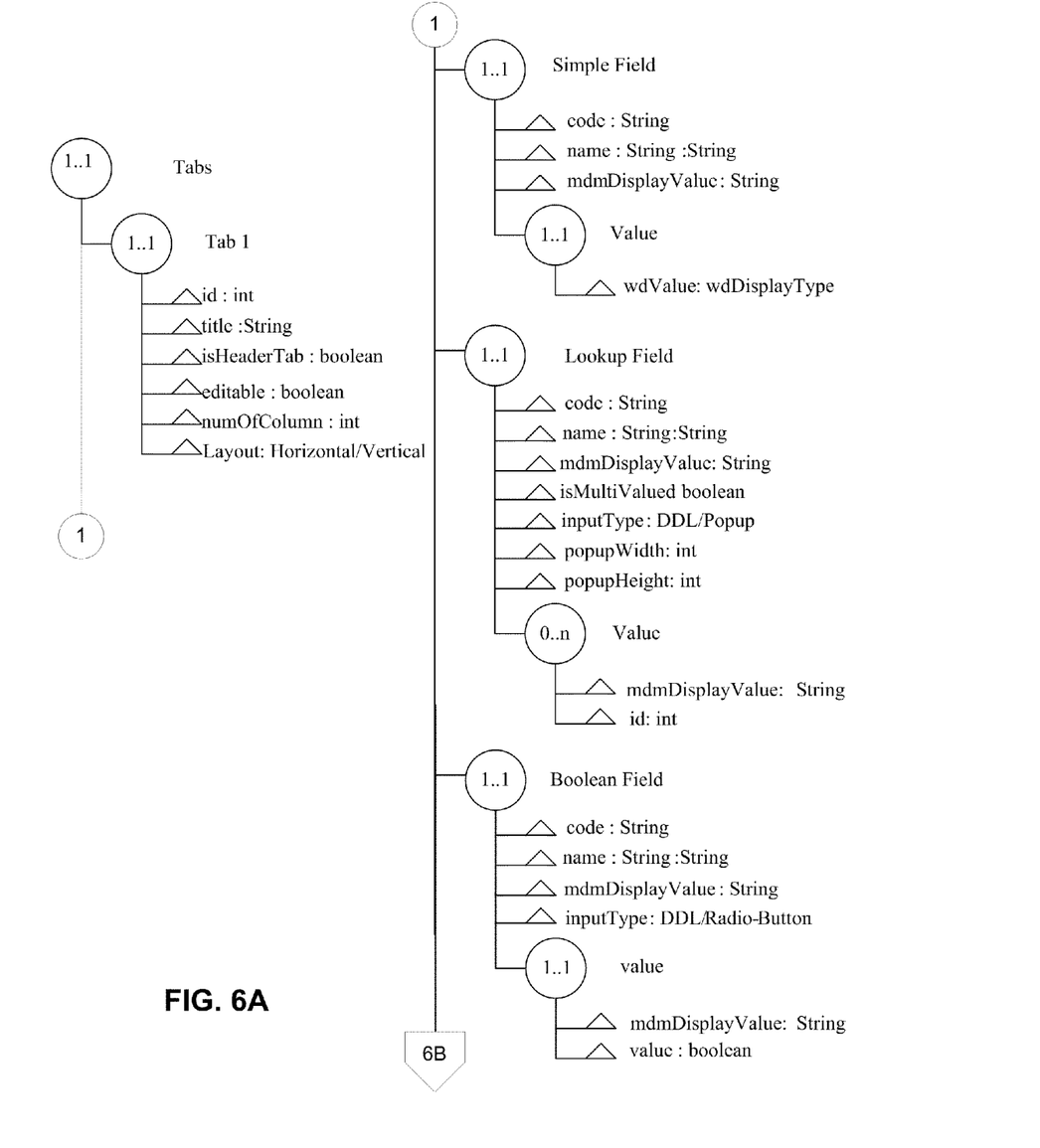
FIG. 6A-6C illustrate an example of a component built dynamically at runtime in one or more embodiments of the solution.
Figure 6B:
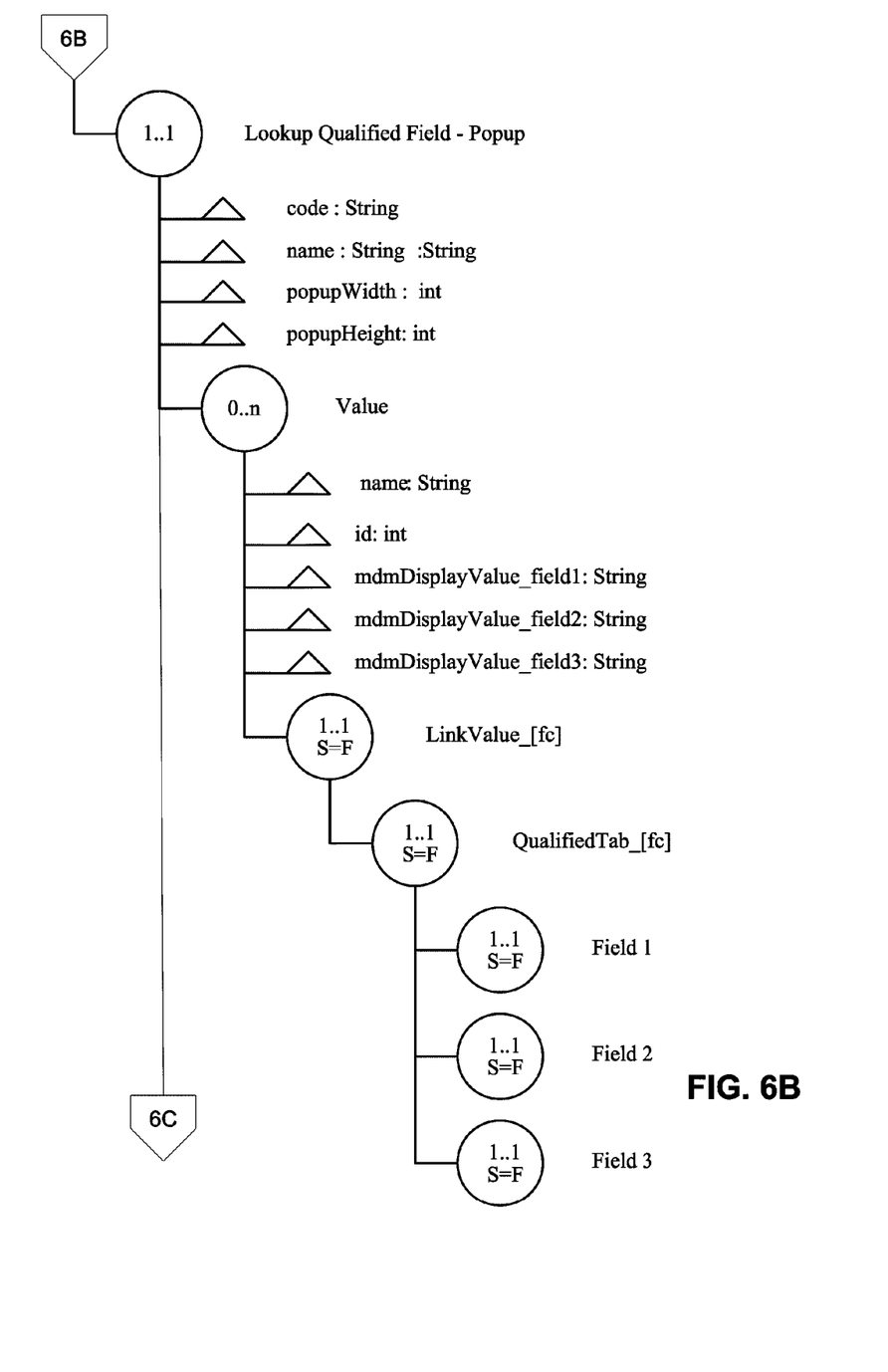
Figure 6C:
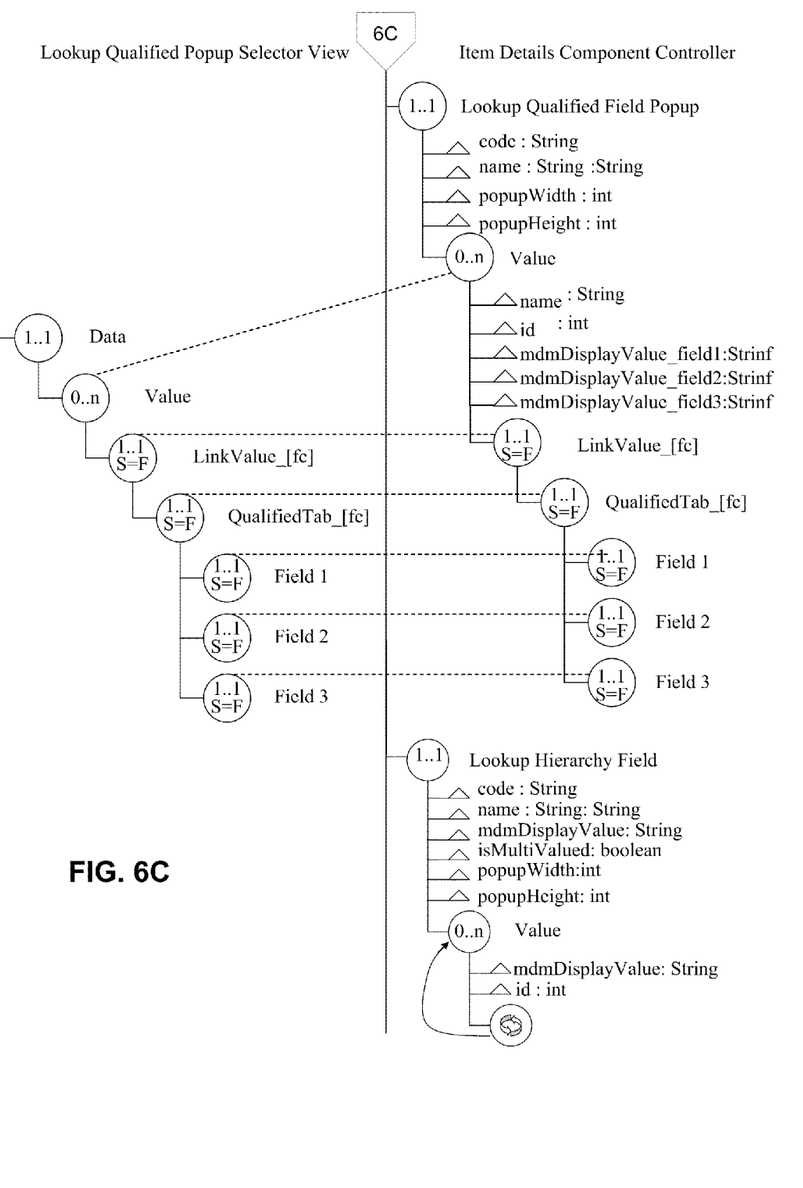

FIG. 6A-6C illustrate an example of a component built dynamically at runtime in one or more embodiments of the solution. The Item Details Component Controller Context of the example may be built dynamically at runtime, with a node for each tab, and within each tab node, data nodes according to each MDM data type, as shown in the following representation. The node elements may be used to bind to the corresponding web UI elements, and also for holding the changed form data that may then be submitted to a backend model for processing.

COMPUTER SYSTEM ARCHITECTURE

The method described here is not limited as to the type of computer it may run upon and may for instance operate on any generalized computer system that has the computational ability to execute the methods described herein and can display the results of the users choices on a display means. The computer typically includes at least a keyboard, a display device such as a monitor, and a pointing device such as a mouse. The computer also typically comprises a random access memory, a read only memory, a central processing unit and a storage device such as a hard disk drive. In some embodiments of the interface, the computer may also comprise a network connection that allows the computer to send and receive data through a computer network such as the Internet. Mobile computer platforms such as cellular telephones, smart phone, Personal Desktop Assistants (PDAs), kiosks, set top boxes, games boxes or any other computational device, portable, personal or otherwise, may also qualify as a computer system capable of executing the methods described herein.

In various embodiments, the solutions described in this disclosure may be implemented as a method, apparatus, or article of manufacture using standard "programming and/or engineering techniques to produce software, firmware, hardware, or any combination thereof. The term "article of manufacture" (or alternatively, "computer program product") as used herein is intended to encompass a computer program code accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus, the article of manufacture also comprises the medium in which the code is embedded. Those skilled in the art will recognize that many modifications may be made to this configuration without departing from the scope of this disclosure.

Embodiments of the system use methods and data embodied in software that may execute on one or more computers having a computer usable memory medium (or a computer readable memory medium) and computer readable program code. The computer readable program code may include various functions configured to form a system and method for creation and runtime rendering of web-based user interface applications for a master data management application.

Furthermore, embodiments may be implemented as a program of computer-readable instructions and/or computer-readable data stored on a computer-readable medium. Programs, data and other information may constitute, but are not limited to, sets of computer instructions, code sequences, configuration information, and other information in any form, format or language usable by a general purpose computer or other processing device, such that when such a computer contains, is programmed with, or has access to the programs, data and other information, the general purpose computer is transformed into a machine capable of performing system and methods for creation and runtime rendering of web-based user interface applications for master data management applications, such as those described above. A computer-readable medium suitable to provide computer readable instructions and/or computer readable data for the methods and processes described herein may be any type of magnetic, optical, or electrical storage medium including a disk, tape, CD, DVD, flash drive, thumb drive, storage card, or any other memory device or other storage medium known to those of skill in the art.

In one or more embodiments, the methods described here may not be limited as to the type of computer it may run upon and may for instance operate on any generalized computer system that has the computational ability to execute the methods described herein and can display the results of the user's choices on one or more display devices. Display devices appropriate for providing interaction with the solutions described herein include, but are not limited to, computer monitors, cell phones, PDAs, televisions, or any other form of computer controllable output display. As used herein, a computer system refers to but is not limited to any type of computing device, including its associated computer software, data, peripheral devices, communications equipment and any required or desired computers that may achieve direct or indirect communication with a primary computing device.

In one or more embodiments, a general-purpose computer may be utilized to implement one or more aspects of the solutions described herein. The computer may include various input and output means, including but not limited to a keyboard or other textual input devices, a display device such as a monitor or other display screen, and a pointing device and/or user selection indicator such as a mouse, keypad, touch screen, pointing device, or other known input/output devices known to those of skill in the art. The general-purpose computer described herein may include one or more banks of random access memory, read only memory, and one or more central processing unit(s). The general-purpose computer described herein may also include one or more data storage device(s) such as a hard disk drive, or other computer readable memory medium discussed above. An operating system that executes within the computer memory may provide an interface between the hardware and software. The operating system may be responsible for managing, coordinating and sharing of the limited resources within the computer. Software programs that run on the computer may be performed by an operating system to provide embodiments with access to the resources needed to execute. In other embodiments the solution described here may run stand-alone on the processor to perform the methods described herein.

The method(s) described herein, when loaded on or executing through or by one or more general purpose computer(s) described above, may transform the general-purpose computer(s) into a specially programmed computer able to perform the method or methods described herein. In one or more embodiments, the computer-readable storage medium(s) encoded with computer program instructions that, when accessed by a computer, may cause the computer to load the instructions to a memory there accessible, thereby creates a specially programmed computer able to perform the methods described herein as a specially programmed computer.

The specially programmed computer may also comprise a connection that allows the computer to send and/or receive data through a computer network such as the Internet or other communication network. Mobile computer platforms such as cellular telephones, Personal Desktop Assistants (PDAs), other hand-held computing devices, digital recorders, wearable computing devices, kiosks, set top boxes, games boxes or any other computational device, portable, personal, real or virtual or otherwise, may also qualify as a computer system or part of a computer system capable of executing the methods described herein as a specially programmed computer.

Figure 7:
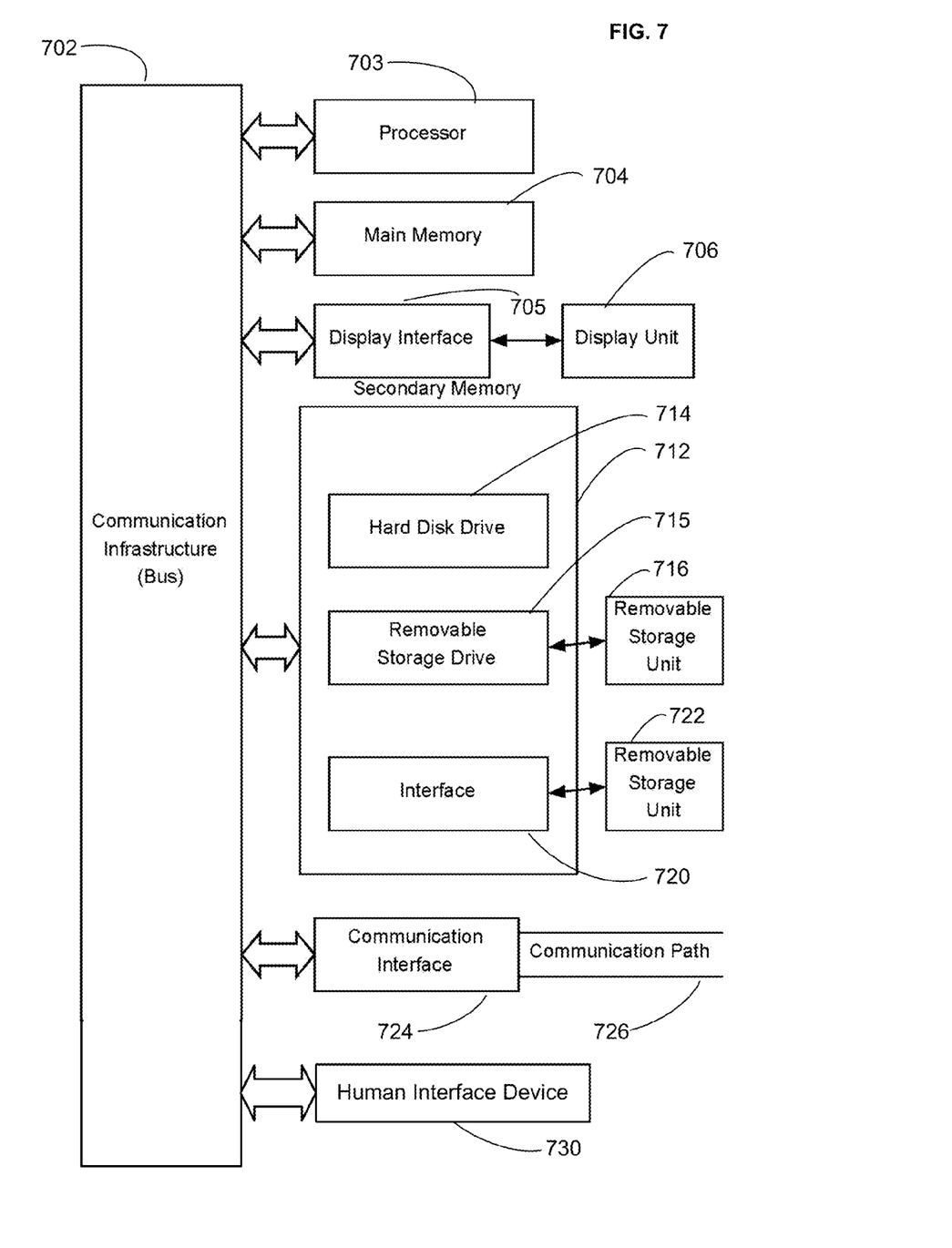
FIG. 7 illustrates a general-purpose computer and peripherals that when programmed as described herein may operate as a specially programmed computer capable of implementing one or more methods, apparatus and/or systems of the solution.

FIG. 7 depicts a general-purpose computer and peripherals, when programmed as described herein, may operate as a specially programmed computer capable of implementing one or more methods, apparatus and/or systems of the solution described in this disclosure. Processor 707 may be coupled to bi-directional communication infrastructure 702 such as Communication Infrastructure System Bus 702. Communication Infrastructure 702 may generally be a system bus that provides an interface to the other components in the general-purpose computer system such as Processor 707, Main Memory 706, Display Interface 708, Secondary Memory 712 and/or Communication Interface 724.

Main memory 706 may provide a computer readable medium for accessing and executed stored data and applications. Display Interface 708 may communicate with Display Unit 710 that may be utilized to display outputs to the user of the specially-programmed computer system. Display Unit 710 may comprise one or more monitors that may visually depict aspects of the computer program to the user. Main Memory 706 and Display Interface 708 may be coupled to Communication Infrastructure 702, which may serve as the interface point to Secondary Memory 712 and Communication Interface 724. Secondary Memory 712 may provide additional memory resources beyond main Memory 706, and may generally function as a storage location for computer programs to be executed by Processor 707. Either fixed or removable computer-readable media may serve as Secondary Memory 712. Secondary Memory 712 may comprise, for example, Hard Disk 714 and Removable Storage Drive 716 that may have an associated Removable Storage Unit 718. There may be multiple sources of Secondary Memory 712 and systems implementing the solutions described in this disclosure may be configured as needed to support the data storage requirements of the user and the methods described herein. Secondary Memory 712 may also comprise Interface 720 that serves as an interface point to additional storage such as Removable Storage Unit 722. Numerous types of data storage devices may serve as repositories for data utilized by the specially programmed computer system. For example, magnetic, optical or magnetic-optical storage systems, or any other available mass storage technology that provides a repository for digital information may be used.

Communication Interface 724 may be coupled to Communication Infrastructure 702 and may serve as a conduit for data destined for or received from Communication Path 726. A Network Interface Card (NIC) is an example of the type of device that once coupled to Communication Infrastructure 702 may provide a mechanism for transporting data to Communication Path 726. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication Path 726 may comprise any type of telecommunication network or interconnection fabric that can transport data to and from Communication Interface 724.

To facilitate user interaction with the specially programmed computer system, one or more Human Interface Devices (HID) 730 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to Processor 707 to trigger one or more responses from the specially programmed computer are within the scope of the system disclosed herein.

While FIG. 7 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 7.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

While the solutions and advantages herein disclosed has been described by means of specific embodiments and applications thereof, numerous modifications and variations could be made thereto by those skilled in the art without departing from the scope of the disclosure set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. An apparatus comprising a non-transitory computer-readable medium having computer program code stored thereon which, when executed by a machine, causes said machine to perform operations of:

acquiring metadata of a schema of a master data management database at initialization, said master data management database supporting unified data storage across company branches in a heterogeneous information technology landscape and said metadata identifying a plurality of schema elements;

selecting a schema element from said plurality of schema elements in said metadata;

identifying a set of all appropriate Web UI element options for said schema element;

presenting to a UI designer a graphic user interface populated with said schema element and said set of all appropriate Web UI element options for said schema element;

accepting from said UI designer a selected Web UI element from said set of all appropriate Web UI element options;

generating a Web UI component definition comprising a link between said schema element and said selected Web UI element;

presenting said UI designer with a plurality of layout options for said Web UI component definition;

receiving from said UI designer a selected layout option;

storing said Web UI component definition related to said link in said master data management database along with information associated with said selected layout option.

2. The apparatus of claim 1 further comprising presenting said UI designer with a default layout option for said Web UI component definition.

3. The apparatus of claim 1 further comprising when invoked by a user at runtime, causing said Web UI component definition to load and be processed so as to render a Web UI.

4. A computer-implemented method comprising:

acquiring metadata of a schema of a master data management database at initialization, said master data management database supporting unified data storage across company branches in a heterogeneous information technology landscape and said metadata identifying a plurality of schema elements;

selecting a schema element from said plurality of schema elements in said metadata;

identifying a set of all appropriate Web UI element options for said schema element;

presenting to a UI designer a graphic user interface populated with said schema element and said set of all appropriate Web UI element options for said schema element;

accepting from said UI designer a selected Web UI element from said set of all appropriate Web UI element options;

generating a Web UI component definition comprising a link between said schema element and said selected Web UI element;

presenting said UI designer with a plurality of layout options for said Web UI component definition;

receiving from said UI designer a selected layout option;

storing said Web UI component definition related to said link in said master data management database along with information associated with said selected layout option.

5. The computer-implemented method of claim 4 further comprising presenting said UI designer with a default layout option for said Web UI component definition.

6. The computer-implemented method of claim 4 further comprising when invoked by a user at runtime, causing said Web UI component definition to load and be processed so as to render a Web UI.

7. A system comprising a computer memory for storing program code and a processor for processing said program code to perform operations of:

acquiring metadata of a schema of a master data management database at initialization, said master data management database supporting unified data storage across company branches in a heterogeneous information technology landscape and said metadata identifying a plurality of schema elements;

selecting a schema element from said plurality of schema elements in said metadata;

identifying a set of all appropriate Web UI element options for said schema element;

presenting to a UI designer a graphic user interface populated with said schema element and said set of all appropriate Web UI element options for said schema element;

accepting from said UI designer a selected Web UI element from said set of all appropriate Web UI element options;

generating a Web UI component definition comprising a link between said schema element and said selected Web UI element;

presenting said UI designer with a plurality of layout options for said Web UI component definition;

receiving from said UI designer a selected layout option;

storing said Web UI component definition related to said link in said master data management database along with information associated with said selected layout option.

8. The system of claim 7 further comprising presenting said UI designer with a default layout option for said Web UI component definition.

9. The system of claim 7 further comprising when invoked by a user at runtime, causing said Web UI component definition to load and be processed so as to render a Web UI.

* * * * *